United States Patent Office 3,504,029
Patented Mar. 31, 1970

3,504,029
FLUOROACYLAMINO-TRICHLOROMETHYL-METHANE DERIVATIVES
Christa Fest, Wuppertal-Elberfeld, and Ingeborg Hammann, Cologne, Germany, assignors to Farbenfabriken Bayer Aktiengesellschaft, Leverkusen, Germany, a corporation of Germany
No Drawing. Filed Jan. 24, 1967, Ser. No. 611,227
Claims priority, application Germany, Feb. 2, 1966, F 48,316
Int. Cl. C07c 97/10
U.S. Cl. 260—562  3 Claims

ABSTRACT OF THE DISCLOSURE

The disclosure concerns reacting fluoroacetylamino-trichloromethyl-chloromethane with a substituted mercaptan or mercaptide (M—S—R where M is hydrogen or alkali metal) to form the corresponding 1-(R)-mercapto-1-fluoroacetylamino-2,2,2-trichloro-ethane in which R is nitrile, guanyl, alkoxy-carbonyl, alkoxythiocarbonyl, dialkylamino thiocarbonyl, acyl, alkyl, aryl, substituted aryl, or heterocyclic, or to form the corresponding hydrogen chloride salt, which possess insecticidal and acaricidal properties.

---

The present invention relates to particular new fluoroacylamino - trichloromethyl - methane derivatives which have insecticidal and acaricidal properties, to their compositions with dispersible carrier vehicles, and to methods for their production and use.

It is already known that carbamates can be used for for combating insects and mites. Thus, 1-naphthyl-N-methyl carbamate (A) is used in practice for destroying insects and 3 - methyl-4-dimethylamino-phenyl-N-methyl carbamate (B) is used for combating mites (cf. U.S. Patents 2,903,478 and 3,134,806).

It is an object of the present invention to provide particular new fluoroacylamino-trichloromethyl-methane derivatives, and especially 1-substituted mercapto-1-fluoroacetylamino-2,2,2-trichloro-ethanes, which possess valuable pesticidal, including arthropodicidal, i.e., insecticidal and acaricidal, properties; to provide active compositions in the form of mixtures of such compounds with solid and liquid dispersible carrier vehicles; to provide a process for producing such compounds; and to provide methods of using such compounds in a new way, especialy for combating insects, acarids, and the like.

Other and further objects of the present invention will become apparent from a study of the within specification and accompanying examples.

It has now been found, in accordance with the present invention, that the particular new 1-substituted mercapto-1 - fluoroacetylamino - 2,2,2 - trichloro-ethanes having the general formula:

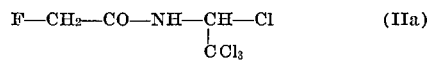

in which R is selected from the group consisting of nitrile; guanyl; lower alkoxy carbonyl; lower alkoxy thiocarbonyl; dilower alkylamino thiocarbonyl; alkanoyl having 1–8 carbon atoms; phenylcarbonyl; lower alkyl; halolower-alkyl; aryl having 6–10 ring carbon atoms; substituted aryl having 6–10 ring carbon atoms which is substituted with a substituent selected from the group consisting of halo, lower alkyl, lower alkoxy, lower alkyl mercapto, and mixtures of such substituents; and heterocyclic having 1–2 rings with 5–6 members in each ring and 1–2 ring hetero atoms selected from the group consisting of oxygen, nitrogen, sulfur, and mixtures of two such hetero atoms; and, in case R is guanyl, the corresponding acid salts thereof, exhibit strong insecticidal properties.

It has been furthermore found in accordance with the present invention that a process for the production of such fluoroacylamino-trichloromethyl-methane derivatives of Formula I above may be provided which comprises reacting fluoroacylamino-trichloromethyl-chloromethane of the formula

with a thio compound (i.e., mercaptan or mercaptide) of the formula $$M—S—R \qquad (IIb)$$

in which R is the same as defined above and M represents hydrogen or an alkali metal such as sodium, potassium, etc., if desired, in the presence of acid-binding agents.

For example, when thiophenol is used as a reaction component, the reaction according to the present invention can be illustrated by the following scheme:

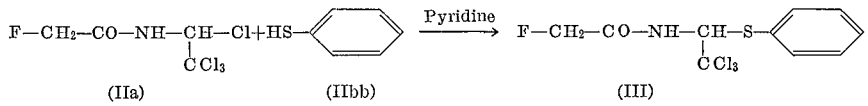

The starting materials for the instant production process are known. The thio compounds which may be used as reaction component are clearing characterized by Formula IIb above.

The reaction, used for producing the particular new compounds of the present invention, is expediently carried out in the presence of diluents which may be varied in accordance with the reaction components. Suitable diluents are mainly hydrocarbons (such as benzine and benzene), chlorinated hydrocarbons (such as carbon tetrachloride and chlorobenzene), ethers (such as dioxan), ketones (such as acetone), alcohols (such as methanol), highly polar solvents (such as acetonitrile), and also water.

If the thio compound is used in the free form, it is expedient to add an acid-binder in order to bind the correspondingly produced hydrochloric acid. Tertiary amines, such as pyridine, triethylamine and trimethylamine, are especially suitable for this purpose.

If thioureas are used, an acid is added during the reaction, expediently a strong inorganic acid, such as hydrochloric or sulfuric acid.

If the thio compounds are used in the form of their salts, of course then it is not necessary to add an acid-binding agent.

The reaction temperatures may be varied within a certain range; in general, the operation is carried out between about $-20$ and $+60°$ C., preferably between 15 and 50° C.

Approximately equimolar amounts of the starting materials are used for carrying out the process according to the instant invention. The use of an excess of one or the other reaction component presents no particular advantage. The acid-binders are also used in an equimolar amount or in a slight excess.

The reaction is carried out in the usual manner by mixing the reaction components, expediently with the use of a diluent. Working up is carried out in the usual manner, for example, by filtration and subsequent concentration of the filtrate.

Advantageously, the particular new active compounds according to the present invention have strong insecticidal and acaricidal effects and only a low toxicity towards warm-blooded animals and plants. The effects appear rapidly and are long-lasting. Surprisingly, the instant active compounds are generally superior to known carbamates with respect to insecticidal and acaricidal activity and can therefore be used with good results for combating noxious sucking and biting insects, Diptera and mites (Acarina), and the like.

The sucking insects contemplated essentially include aphids, such as the peach aphid (*Myzus persicae*), the black bean aphid (*Doralis fabae*); Coccidae, such as *Aspidiotus hederae, Lecanium hesperidum, Pseudococcus martinimus;* Thysanoptera such as *Hercinothrips femoralis;* and bugs, such as the beet bug (*Piesma quadrata*) and the bed bug (*Cimex lectularius*); and the like.

The biting insects contemplated essentially include butterfly larvae, such as *Plutella maculipennis, Lymantria dispar*; beetles, such as grain weevils (*Sitophilus granarius*), the Colorado beetle (*Leptinotarsa decemlineata*), but also species living in the soil, such as wire worms (Agriotes sp.) and cockchafer larvae (*Melolontha melolontha*); cockroaches, such as the German cockroach (*Blatella germanica*); Orthopetera, such as the cricket (*Gryllus domesticus*); termites, such as Reticulitermes; Hymenoptera, such as ants; and the like.

The Diptera contemplated particularly comprise the flies, such as the common fruit fly (*Drosophila melanogaster*), the Mediterranean fruit fly (*Ceratitis capitata*), the house fly (*Musca domestica*) and gnats, such as the mosquito (*Aedes aegypti*); and the like.

The following mites are of particular importance herein: the spider mites (*Tetranychidae*), such as the common spider mite (*Tetranychus urticae*), the fruit tree spider mite (*Paratetranychus pilosus*); gall mites, such as the red currant gall mite (*Eriophyes ribis*), and tarsonemides, such as *Tarsonemus pallidus*; and also ticks; and the like.

Significantly, the particular new active compounds of the present invention exhibit an especially good systemic action.

The active compounds according to the instant invention can be utilized, if desired, in the form of the usual formulations or compositions with dispersible carrier vehicles, such as solutions, emulsions, suspensions, emulsifiable concentrates, spray powders, pastes, soluble powders, dusting agents, granulates, etc. These are prepared in known manner, for instance by extending the active agents with dispersible liquid diluent carriers and/or dispersible solid carriers optionally with the use of carrier vehicle assistants, e.g., surface-active agents, including emulsifying agents and/or dispersing agents, whereby, for example, in the case where water is used as diluent, organic solvents may be added as auxiliary solvents (cf. Agricultural Chemicals, March 1960, pp. 35–38). The following may be chiefly considered for use as carrier vehicles for this purpose: dispersible liquid diluent carriers, such as aromatic hydrocarbons (for instance, benzene, toluene, xylene, etc.), halogenated, especially chlorinated, aromatic hydrocarbons (for instance, chlorobenzenes), paraffins (for instance, petroleum fractions), chlorinated aliphatic hydrocarbons (for instance, methylene chloride, etc.), alcohols (for instance, methanol, ethanol, propanol, butanol, etc.), ethers, ether-alcohols (for instance, glycol monomethyl ether, etc.), amines (for instance, ethanolamine, etc.), amides (for instance, dimethyl formamide, etc.), sulfoxides (for instance, dimethyl sulfoxide, etc.), ketones (for instance, acetone, etc.), and water; as well as dispersible finely divided solid carriers, such as ground natural minerals (for instance, kaolins, alumina, silica, chalk, i.e., calcium carbonate, talc, kieselguhr, etc.), and ground synthetic minerals (for instance, highly dispersed silicic acid, silicates, e.g., alkali silicates, etc.); whereas the following may be chiefly considered for use as carrier vehicle assistants, e.g., surface-active agents, for this purpose: emulsifying agents, such as nonionic and anionic emulsifying agents (for instance, polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and dispersing agents, such as lignin, sulfite waste liquors, methyl cellulose, etc.

As will be appreciated by the artisan, the active compounds to the instant invention may be present in such formulations or compositions in the form of mixtures with one another and with other known active substances, if desired.

The substances according to the invention may be employed, therefore, by themselves as the artisan will appreciate, in the form of their compositions with solid or liquid dispersible carrier vehicles or other known compatible active agents, or in the form of particular dosage preparations for specific application made therefrom, such as solutions, emulsions, suspensions, powders, pastes, and granulates which are thus ready for use.

As concerns commercially marketed preparations, these generally contemplate carrier composition mixtures in which the active compound is present in an amount substantially between about 0.1 and 95% by weight, and preferably 0.5 and 90% by weight, of the mixture, whereas carrier composition mixtures suitable for direct application or field application generally contemplate those in which the active compound is present in an amount substantially between about 0.00001 and 20%, preferably 0.01 and 5%, by weight of the mixture. Thus, the present invention contemplates over-all compositions which comprise mixtures of a dispersible carrier vehicle such as a dispersible carrier solid, or a dispersible carrier liquid preferably including a carrier vehicle assistant, e.g., a surface-active agent, such as an emulsifying agent and/or a dispersing agent, and an amount of the active compound which is effective for the purpose in question and which is generally between about 0.00001 and 95% by weight of the mixture.

Furthermore, the present invention contemplates methods of selectively controlling or combating pests, especially arthropods, such as insects and acarids, and more particularly, methods of controlling at least one of insects and acarids, which comprise applying to at least one of correspondingly (a) such insects, (b) such acarids, and (c) the corresponding habitat, a pesticidally, especially insecticidally and acaricidally, i.e., arthropodicidally, effective amount of the particular active compound of the invention alone or together with a carrier vehicle as noted above. The instant formulations or compositions are applied in the usual manner, for example, by spraying, atomizing, scattering, dusting, watering, sprinkling, pouring and the like. Since the active compounds also have a systemic action, they need not be applied to agricultural crops by introduction into the vicinal soil of such crops for take-up by the particular plants, but instead may also be used above ground by merely applying the compound alone or in admixture with the carrier vehicle to the plant crops.

The activity of the compounds of the present invention is illustrated, without limitation, by way of the following Examples 1 and 2:

EXAMPLE 1

Rhopalosiphum test (systemic action)

Solvent: 3 parts by weight dimethyl formamide
Emulsifier: 1 part by weight alkylaryl polyglycol ether To produce a suitable preparation of the given active compound, 1 part by weight of such active compound is mixed with the stated amount of solvent containing the stated amount of emulsifier, and the resulting concentrate is diluted with water to the desired concentration.

Oat plants (*Avena sativa*) which are heavily infested with oat aphids (*Rhopalosiphum padi*) are watered with the preparation of the given active compound so that the preparation penetrates into the soil without wetting the leaves of the oat plants. The active compound is taken up by the oat plants from the soil and thus reaches the infested leaves.

After a specified period of time, the degree of destruction is determined as a percentage: 100% means that all the aphids are killed whereas 0% means that none are killed.

The active compounds, their concentrations, the evaluation time and the results obtained can be seen from the following Table 1:

TABLE 1.—PLANT DAMAGING INSECTS

| Active compound | | Concentration of active compound as percent | Degree of destruction as percent after 8 days |
|---|---|---|---|
| (A) | $\text{O--CO--NH--CH}_3$ on naphthyl (known) | 0.2<br>0.02 | 100<br>0 |
| (IV) | $\text{F--CH}_2\text{--CO--NH--CH(CCl}_3\text{)--S--C(NH}_2\text{)=NH} \cdot \text{HCl}$ | 0.2<br>0.02<br>0.002 | 100<br>100<br>100 |
| (V) | $\text{F--CH}_2\text{--CO--NH--CH(CCl}_3\text{)--SCN}$ | 0.2<br>0.02<br>0.002 | 100<br>100<br>98 |
| (VI) | $\text{F--CH}_2\text{--CO--NH--CH(CCl}_3\text{)--SC}_2\text{H}_5$ | 0.2<br>0.02<br>0.002 | 100<br>100<br>95 |

EXAMPLE 2

Tetranychus test

Solvent: 3 parts by weight dimethyl formamide
Emulsifier: 1 part by weight alkylaryl polyglycol ether To produce a suitable preparation of the given active compound, 1 part by weight of such active compound is mixed with the stated amount of solvent containing the stated amount of emulsifier and the concentrate so obtained is diluted with water to the desired concentration.

Bush beans (*Phaseolus vulgaris*), which have a height of approximately 10–30 cm., are sprayed with the preparation of the active compound until dripping wet. The bush beans are then heavily infested with spider mites (*Tetranychus urticae*) in all stages of development.

After a specified period of time, the effectiveness of the preparation of the given active compound is determined by counting the dead mites. The degree of destruction thus obtained is expressed as a percentage: 100% means that all the spider mites are killed, whereas 0% means that none are killed.

The active compounds, their concentrations, the evaluation time and the results obtained can be seen from the following Table 2:

TABLE 2.—PLANT DAMAGING MITES

| Active compound | | Concentration of active compound as percent | Degree of destruction as percent after 8 days |
|---|---|---|---|
| (B) | $(\text{CH}_3)_2\text{N--}\underset{\text{CH}_3}{\text{C}_6\text{H}_3}\text{--O--CO--NH--CH}_3$ (known) | 0.2 | 70 |
| (III′) | $\text{F--CH}_2\text{--CO--NH--CH(CCl}_3\text{)--S--C}_6\text{H}_5$ | 0.2<br>0.02<br>0.002 | 100<br>100<br>50 |
| (VII) | $\text{F--CH}_2\text{--CO--NH--CH(CCl}_3\text{)--S--C}_6\text{H}_4\text{Cl}$ | 0.2<br>0.02 | 100<br>100 |
| (VI′) | $\text{F--CH}_2\text{--CO--NH--CH(CCl}_3\text{)--SC}_2\text{H}_5$ | 0.2 | 100 |
| (VIII) | $\text{F--CH}_2\text{--CO--NH--CH(CCl}_3\text{)--S--C}_6\text{H}_4\text{--CH}_3$ | 0.2<br>0.02 | 90<br>50 |

The production process of the present invention is illustrated, without limitation, by way of the following examples:

EXAMPLE 3

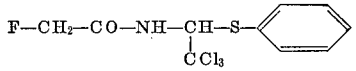
(III″)

74 g. (3/10 mol) fluoroacetylamino-trichloromethylchloro-methane were suspended in 200 cc. ether and 33 g. (3/10 mol) thiophenol were added dropwise thereto. 24 g. (3/10 mol) pyridine were also added at 15° C. The reaction was exothermic. The mixture was further stirred at room temperature for 10 hours and then filtered off with suction from the hydrochloride. The resulting ethereal solution was concentrated. A product of M.P. 64° C. was thus obtained, i.e., fluoroacetylamino-trichloromethyl-phenylmercaptomethane or 1 - phenylmercapto-1-fluoroacetylamino - 2,2,2 - trichloroethane, which was recrystallized from cyclohexane/petroleum ether.

The following compounds were prepared in an analogous manner:

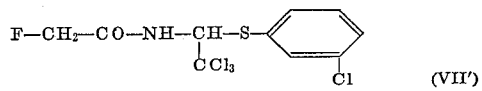
(VII')

M.P. 80–81° C., recrystallized from cyclohexane/petroleum ether. Yield 48% of theory of 1-(3'-chlorophenyl-mercapto)-1-fluoroacetylamino-2,2,2-trichloro-ethane.

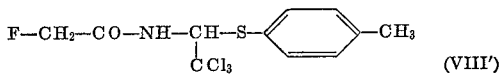
(VIII')

M.P. 67–68° C., recrystallized from cyclohexane/petroleum ether. Yield 37% of theory of 1-(4'-methylphenyl-marcapto)-1-fluoroacetylamino-2,2,2-trichloro-ethane.

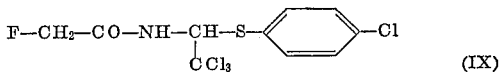
(IX)

M.P. 75° C., recrystallized from ligroin. Yield 48% of theory of 1-(4'-chlorophenyl-mercapto)-1-fluoroacetyl-amino-2,2,2-trichloro-ethane.

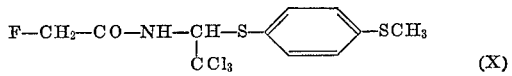
(X)

M.P. 76° C. Yield 41.5% of theory of 1-(4'-methyl-mercapto-phenyl-mercapto) - 1 - fluoroacetylamino-2,2,2-trichloro-ethane.

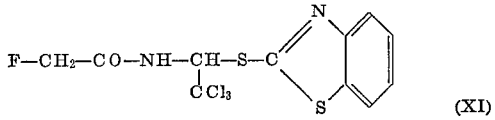
(XI)

Yield 41% of theory of 1-(benzothiazol-2-yl-mercapto)-1-fluoroacetylamino-2,2,2-trichloro-ethane.

Analysis.—Calc. for $C_{11}H_8N_2S_2OCl_3F$ (percent): N, 7.5; S, 17.2. Found (percent): N, 7.37, S, 17.96.

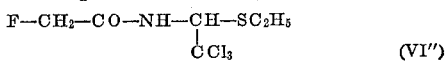
(VI'')

M.P. 85° C., recrystallized from alcohol. Yield 35% of theory of 1 - ethylmercapto - 1 - fluoroacetylamino-2,2,2-trichloroethane.

EXAMPLE 4

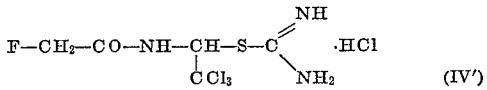
(IV')

73 g. (3/10 mol) fluoroacetylamino-trichloromethylchloromethane were dissolved in 100 cc. methanol and 5 cc. dilute hydrochloric acid (1:1) were added thereto. 23 g. (3/10 mol) thiourea were introduced with cooling. The reaction mixture was further stirred at room temperature for several hours. A greasy yellow mass formed, which was triturated with isopropanol. M.P. 150° C. (decomposition). Yield 42% of theory of 1-guanylmercapto-1-fluoroacetylamino-2,2,2-trichloro-ethane hydrochloride.

EXAMPLE 5

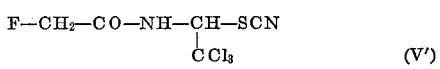
(V')

121 g. (½ mol) fluoroacetylamino-trichloromethyl-chloromethane were dissolved in 300 cc. acetonitrile and 48 g. (½ mol) potassium thiocyanate in 100 cc. acetonitrile were introduced at 15° C. Stirring was continued at room temperature for several hours. The precipitated potassium chloride was filtered off with suction, the filtrate was concentrated in a vacuum and then subjected to a careful partial distillation. A red-brown oil was obtained. Yield 63 g. (48% of theory) of 1-thiocyano-1-fluoroacetylamino-2,2,2-trichlorothane.

Analysis.—Calc'd for $C_5H_4ON_2SCl_3F$ (percent): N, 10.58; S, 12.06; Cl, 40.03. Found (percent): N, 10.23; S, 10.46; Cl, 38.75.

EXAMPLE 6

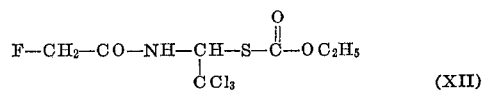
(XII)

73 g. (3/10 mol) fluoroacetylamino-trichloromethyl-chloromethane were dissolved in 200 cc. acetone and mixed at 15° C. with 43 g. (3/10 mol) potassium O-ethyl thiocarbonate. Stirring was continued for several hours in the cold and the formed potassium chloride then filtered off. The filtrate was concentrated. The new compound had a M.P. of 60° C. Yield 26 g. (28% of theory) of 1 - (ethoxycarbonyl - mercapto) - 1-fluoroacetylamnio-2,2,2-trichloro-ethane or 1-[S-(O-ethylthiocarbonato)]-1-fluoroacetylamino-2,2,2-trichloro-ethane.

The following compounds were prepared in an analogous manner:

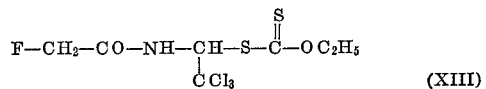
(XIII)

Yield 26% of theory of 1-(ethoxy-thiocarbonyl-mercapto) - 1 - fluoroacetylamino-2,2,2-trichloro-ethane or 1-[S-(O - ethylthionothiolcarbonato)] - 1 - fluoroacetylamino-2,2,2-trichloroethane.

Analysis.—Calc'd for $C_7H_9S_2NCl_3F$ (percent): N, 4.26; Cl, 32.4; F, 5.79. Found (percent): N, 4.60; Cl, 32.7; F, 5.59.

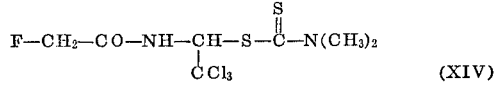
(XIV)

Yield 50% of theory of 1-(dimethylamino-thiocarbonyl-mercapto) - 1-fluoroacetylamino-2,2,2-trichloro-ethane or 1 - (N,N - dimethylthionothiolcarbamyl) - 1-fluoroacetyl-amino-2,2,2-trichloroethane.

Analysis.—Calc. for $C_7H_{10}N_2OS_2Cl_3F$ (percent): N, 8.56; Cl, 32.6; F, 5.81. Found (percent) N, 8.91; Cl, 32.39; F, 5.50.

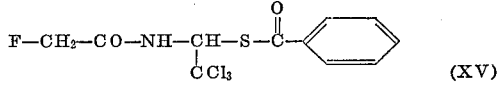
(XV)

Yield 56% of theory of 1-benzoylmercapto-1-fluoroacetyl-amino-2,2,2-trichloro-ethane.

Analysis.—Calc'd for $C_{11}H_9NO_2SCl_3F$ (percent): N, 4.06; S, 9.30; Cl 30.9. Found (percent) N, 3.46; S, 9.11; Cl, 29.64.

EXAMPLE 7

In the same manner, in accordance with the procedure of Example 3 using corresponding molar amounts of fluoroacetylamino-trichloromethyl-chloromethane and the following starting materials, respectively:

(a) 2-chloroethane thiol;
(b) 2-fluoro-1-methyl-propane thiol; and
(c) ethane thiolic acid (i.e., thiolacetic acid); the particular final products, respectively, are formed:

(a') 1-(2'-chloroethyl-mercapto) - 1 - fluoroacetylamino-2,2,2-trichloro-ethane;
(b') 1 - (2'-fluoro-1'-methyl-propyl-mercapto)-1-fluoroacetylamino-2,2,2-trichloro-ethane; and
(c') 1 - acetyl-mercapto - 1 - fluoroacetylamino-2,2,2-trichloro-ethane.

It will be appreciated, in accordance with the present invention, that in connection with the foregoing formulae:
R represents nitrile (i.e., cyano); or guanyl; or lower alkoxycarbonyl such as methoxy-, ethoxy-, n-propoxy-, isopropoxy-, n-butoxy-, isobutoxy-, sec.-butoxy-, tert.-butoxycarbonyl, and the like, especially $C_{1-4}$ alkoxycarbonyl; or lower alkoxy thiocarbonyl such as methoxy- to tert.-butoxy- (i.e., $C_{1-4}$ alkoxy inclusive) -thiocarbonyl, and the like, especially $C_1$-$C_4$ alkoxy thiocarbonyl; or di-lower alkyl-amino thiocarbonyl, such as dimethyl-, di-ethyl-, di-n-propyl-, di-isopropyl-, di-n-butyl-, di-isobutyl-, di-sec.-butyl-, di-tert.-butyl-, methyl-ethyl-, methyl-iso-butyl-, ethyl-n-propyl, ethyl-tert.-butyl-, isopropyl-sec.-butyl-, n-butyl-isobutylamino thiocarbonyl, and the like, especially di-$C_{1-4}$ alkyl amino thiocarbonyl; or alkanoyl having 1–8 carbon atoms such as formyl, acetyl, propionyl, butanoyl, and the like, especially lower alkanoyl and particularly $C_{1-4}$ alkanoyl; or phenylcarbonyl such as benzoyl, and the like; or lower alkyl such as methyl, ethyl, n-propyl, isopropyl, n-butyl, isobutyl, sec.-butyl, tert.-butyl and the like, especially $C_{1-4}$ alkyl; or halo lower alkyl such as mono-, di-, poly-, and mixed- chloro, bromo, iodo and fluoro substituted methyl to tert.-butyl (i.e., $C_{1-4}$ alkyl inclusive), especially chloro and/or fluoro substituted $C_{1-4}$ alkyl; or aryl having 6–10 ring carbon atoms such as phenyl, naphthyl, and the like; or substituted aryl having 6–10 ring carbon atoms such as phenyl and/or naphthyl which is mono-, di-, poly- and mixed- substituted with halo such as chloro, bromo, iodo and fluoro, especially chloro and/or fluoro; lower alkyl such as methyl to tert.-butyl (i.e., $C_{1-4}$ alkyl inclusive), especially $C_{1-4}$ alkyl; lower alkoxy such as methoxy to tert.-butoxy (i.e., $C_{1-4}$ alkoxy inclusive), especially $C_{1-4}$ alkoxy; and lower alkyl mercapto such as methyl- to tert.-butyl- (i.e., $C_{1-4}$ alkyl inclusive) -mercapto, especially $C_{1-4}$ alkylmercapto; or heterocyclic having 1 to 2 rings and 5–6 members in each ring as well as 1 to 2 ring hetero atoms including oxygen, nitrogen and sulfur such as benzothiazolyl; with the corresponding compound being present in the free form or, if R is guanyl, in the form of its corresponding salts, especially inorganic or mineral acid salts such as the hydrogen chloride and sulfuric acid salts, and particularly the hydrogen chloride salt of the corresponding 1-guanylmercapto compound.

In accordance with a preferred feature of the present invention, R is nitrile, guanyl, lower alkyl, phenyl, chlorophenyl, or lower alkyl phenyl.

All of the foregoing compounds contemplated by the present invention possess the desired selective pesticidal, especially arthropodicidal, i.e., insecticidal and/or acaricidal, properties for combating insects and acarids, while exhibiting a comparatively low toxicity toward warm blooded creatures and a concomitantly low phytotoxicity.

It will be appreciated that as may be used herein, i.e., both in the specification and claims, the terms "arthropod," "arthropodicidal" and "arthropodicide" are defined as including specifically both insects and acarids within the contemplation of their meaning, for convenience in determining the collective aspects of utility herein. Thus, the insects and acarids may be considered herein collectively as arthropods to be combated collectively in accordance with the invention, and accordingly the insecticidal and/or acaricidal activity may be termed arthropodicidal activity, and the concomitant combative or effective amount used in accordance with the invention will be an arthropodicidally effective amount which in effect means an insecticidally or acaricidally effective amount of the active compound for the desired purposes.

It will be appreciated that the instant specification and examples are set forth by way of illustration.

What is claimed is:
1. Compound selected from the group consisting of 1-substituted - mercapto - 1 - fluoroacetylamino - 2,2,2,-trichloro-ethane having the formula

$$F-CH_2-CO-NH-\underset{\underset{CCl_3}{|}}{CH}-S-R$$

in which R is selected from the group consisting of phenyl, and 4-methyl-phenyl.

2. The compound 1-phenylmercapto-1-fluoroacetyl-amino-2,2,2-trichloroethane having the formula

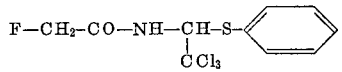

3. The compound 1-(4'-methylphenyl-mercapto)-1-fluoroacetylamino-2,2,2-trichloro-ethane having the formula

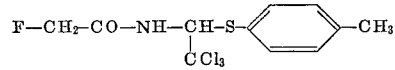

References Cited

UNITED STATES PATENTS 3,253,030   5/1966   Buc _____ 167—22 XR

FOREIGN PATENTS 993,051   5/1965   England.

OTHER REFERENCES

Pianka et al.: J. Sci. Fd. Agric., pp. 330–341 (1965), vol. 16.

HENRY R. JILES, Primary Examiner

HARRY I. MOATZ, Assistant Examiner

U.S. Cl. X.R.

260—455, 481, 561, 454, 471, 306; 424—320, 311, 302, 301, 300, 270.